(No Model.)
A. C. PESSANO.
PULLEYS.
No. 315,336. Patented Apr. 7, 1885.
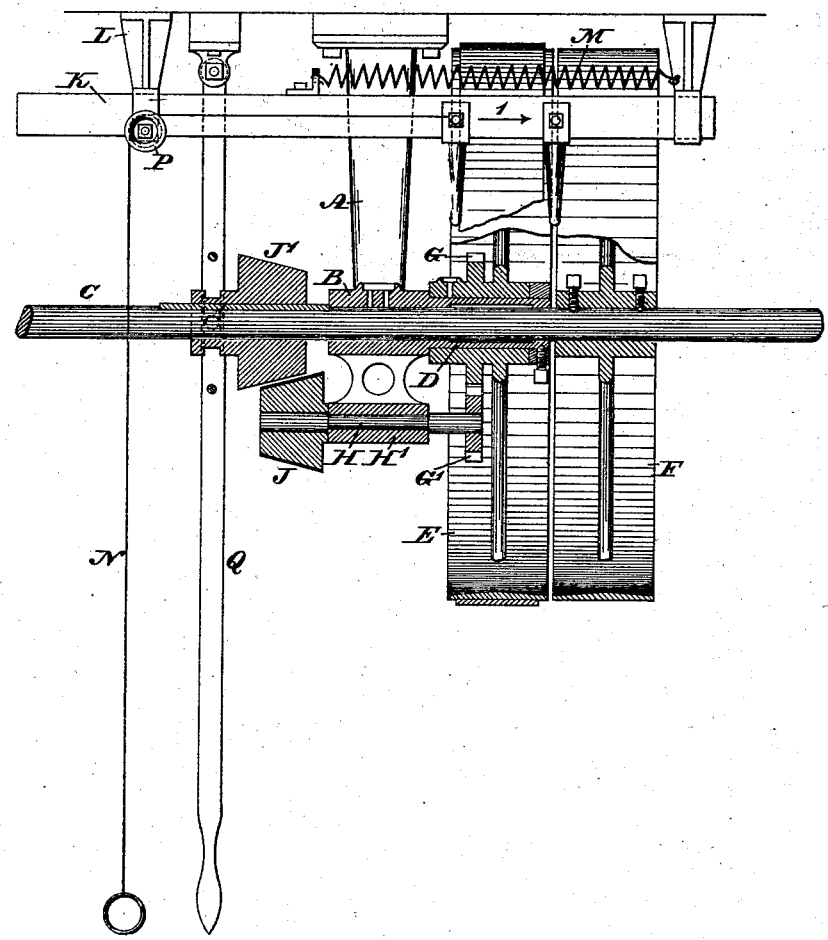
WITNESSES:
INVENTOR:
Antonio C. Pessano
BY John A. Wiedersheim
ATTORNEY.

UNITED STATES PATENT OFFICE.

ANTONIO C. PESSANO, OF PHILADELPHIA, PENNSYLVANIA, ASSIGNOR TO GEORGE V. CRESSON, OF SAME PLACE.

PULLEY.

SPECIFICATION forming part of Letters Patent No. 315,336, dated April 7, 1885.

Application filed February 28, 1885. (No model.)

*To all whom it may concern:*

Be it known that I, ANTONIO C. PESSANO, a citizen of the United States, residing in the city and county of Philadelphia, State of Pennsylvania, have invented a new and useful Improvement in Pulleys, which improvement is fully set forth in the following specification and accompanying drawing, in which the figure is a partial side elevation and partial vertical section of a pulley embodying my invention.

In an application for Letters Patent of the United States filed by me on or about the 20th day of January, A. D. 1885, I show an improvement in the class of dead-pulleys wherein means are provided for automatically shifting a belt from the dead or loose pulley to the tight pulley. In said improvement the loose pulley is movable to and from the tight pulley. In the present improvement, while the results are similar to those of the previous case, provision is made for shifting the belt from the loose to the tight pulley without moving the loose pulley to and from the tight pulley.

Referring to the drawing, A represents a hanger having a bearing, B, for the shaft C, and D represents a sleeve, which, made integral with or separate from the bearing, encircles the shaft C and forms a bearing for a loose or dead pulley, E.

F represents the tight pulley, which is bolted or otherwise firmly secured to the shaft C.

To the hub of the loose pulley E is secured a pinion, G, with which meshes a pinion, G', whose shaft H extends parallel with the shaft C, and is mounted on a bearing, H', which depends from the hanger A, or may be separate therefrom, said shaft H carrying a friction-pulley, J, with which is adapted to engage a friction-pulley, J', the latter being connected with the shaft C by a key or feather, so that it may both rotate with and slide on said shaft A, and thus be shifted to the pulley J, for imparting power from the shaft C by means of the pulleys J' J and gearing G' G to the loose pulley E.

K represents a shifter-bar, which is mounted in hangers L, and has connected with it a spring, M, or equivalent, a weighted cord or chain, the tendency whereof is to press one of the fingers of said bar against the belt on the loose pulley in the direction of the arrow 1. Attached to the bar K is a cord or chain, N, which, passing around a pulley, P, on one of the hangers L, is adapted for returning said bar to its normal position, and consequently replacing the belt on the loose or dead pulley.

Q represents a lever, which is connected with the pulley J and properly mounted, the object of the same being to move the pulley J' to and from the pulley J.

When the lever Q is operated to cause the engagement of the pulleys J J', motion is imparted to the loose pulley, it being noticed that the tight pulley is revolving with the shaft C and the belt is on the loose pulley. As the spring M exerts its pressure on the bar K in the direction of arrow 1, the proper finger of said bar forces the running belt toward the tight pulley, so that said belt is automatically shifted to the tight pulley, and thus power is communicated to the machinery to be operated, and the same is accordingly set in motion, it being noticed that the belt has been shifted without shifting the loose pulley or direct action of the lever Q. The pulley J moves or is moved from the pulley J', and thus the rotation of the loose pulley ceases.

When it is desired to stop the machinery, the cord or chain N is pulled or operated and the proper finger of the shifting-bar K forces the belt toward the loose pulley and it is shifted thereon, whereby it is again at rest, the tight pulley, however, being undisturbed by said action.

Having thus described my invention, what I claim as new, and desire to secure by Letters Patent, is—

1. A loose or dead pulley and a tight pulley, in combination with gearing connected with the loose pulley and adapted to receive power from the shaft of the tight pulley, for imparting motion to said loose pulley and causing the automatic shifting of a belt from the loose to the tight pulley, substantially as described.

2. A loose or dead pulley, a tight pulley and a shaft bearing the same, and a belt-shifting device independent of the shifting-lever, in combination with gearing intermediate of said shaft and the loose pulley and engaging therewith, whereby a belt may be shifted from the loose to the tight pulley without shifting either pulley, substantially as and for the purpose set forth.

3. A loose or dead pulley, a tight pulley and a shaft therefor, a belt-shifting device, gearing connected with the loose pulley and adapted to be engaged with the shaft of the tight pulley, and a lever for putting said gearing in and out of communication with said shaft, said parts being combined and operating substantially as and for the purpose set forth.

4. A loose or dead pulley, a tight pulley, and a belt-shifting device, in combination with gearing connected with the loose pulley, and receiving power from the shaft of the tight pulley, whereby the loose pulley may be operated and the belt automatically shifted from the loose to the tight pulley, substantially as and for the purpose set forth.

5. A loose or dead pulley, a tight pulley, a belt-shifting device adapted to bear against the belt, and a cord or chain for returning said shifting device, in combination with gearing connected with the loose pulley and adapted to be operated by the shaft of the tight pulley, substantially as and for the purpose set forth.

ANTONIO C. PESSANO.

Witnesses:
JOHN A. WIEDERSHEIM,
A. P. GRANT.